United States Patent
Honer et al.

(10) Patent No.: US 10,010,967 B2
(45) Date of Patent: Jul. 3, 2018

(54) COMPONENT COMPOSITE, METHOD FOR MANUFACTURING A COMPONENT COMPOSITE AS WELL AS UTILIZATION OF A COMPONENT COMPOSITE

(71) Applicant: Robert Bosch GmbH, Stuttgart (DE)

(72) Inventors: Michael Honer, Gerlingen (DE); Reiner Ramsayer, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 298 days.

(21) Appl. No.: 14/410,166

(22) PCT Filed: Apr. 26, 2013

(86) PCT No.: PCT/EP2013/058770
§ 371 (c)(1),
(2) Date: Dec. 22, 2014

(87) PCT Pub. No.: WO2013/189650
PCT Pub. Date: Dec. 27, 2013

(65) Prior Publication Data
US 2015/0336213 A1    Nov. 26, 2015

(30) Foreign Application Priority Data
Jun. 22, 2012  (DE) .................. 10 2012 210 621

(51) Int. Cl.
*B23K 20/10*    (2006.01)
*B23K 5/16*    (2006.01)
(Continued)

(52) U.S. Cl.
CPC ............... *B23K 20/10* (2013.01); *B23K 5/16* (2013.01); *B23K 31/02* (2013.01); *B23K 33/00* (2013.01); *Y10T 403/478* (2015.01)

(58) Field of Classification Search
CPC ............ Y10T 403/473; Y10T 403/477; Y10T 403/478; H01M 2/08; B82B 3/0047;
(Continued)

(56) References Cited

U.S. PATENT DOCUMENTS 2,413,370 A * 12/1946 Palmer .............. B23K 35/0288
219/99
2,447,085 A *  8/1948 Odlum ................ B23K 33/006
219/104
(Continued)

FOREIGN PATENT DOCUMENTS

CN     101716700 A    6/2010
CN     102105290 A    6/2011
(Continued)

*Primary Examiner* — Michael P Ferguson
(74) *Attorney, Agent, or Firm* — Norton Rose Fulbright US LLP; Gerard Messina

(57) ABSTRACT

A component composite includes a first component having a first contact surface and at least one second component having a second contact surface contacting the first contact surface, the first contact surface having a surface structure which has a microstructure which is superposed by a nanostructure, the contact of the second contact surface on the first contact surface taking place by at least partially melting the material of the second component, and the melting point of the material of the first component being higher than the melting point of the material of the second component.

7 Claims, 1 Drawing Sheet

(51) Int. Cl.
*B23K 31/02* (2006.01)
*B23K 33/00* (2006.01)

(58) Field of Classification Search
CPC . B29C 65/14; B29C 65/1403; B29C 65/1429; B29C 65/1432
See application file for complete search history.

(56) References Cited

U.S. PATENT DOCUMENTS

| | | | | |
|---|---|---|---|---|
| 3,726,135 | A * | 4/1973 | Vuceta | B25B 23/1427 228/114.5 |
| 6,152,349 | A | 11/2000 | Thuru | |
| 6,455,193 | B1 * | 9/2002 | Miyazaki | H01M 2/365 29/623.2 |
| 7,687,199 | B2 * | 3/2010 | Kim | H01M 2/0404 429/175 |
| 2003/0121952 | A1 | 7/2003 | Tsukamoto | |
| 2004/0115521 | A1 * | 6/2004 | Cho | H01M 2/0404 429/72 |
| 2006/0257733 | A1 * | 11/2006 | Kim | H01M 2/0486 429/185 |
| 2011/0183196 | A1 * | 7/2011 | Suzuki | H01M 2/043 429/185 |
| 2011/0294002 | A1 * | 12/2011 | Kim | H01M 2/023 429/185 |

FOREIGN PATENT DOCUMENTS

| | | |
|---|---|---|
| DE | 10 2008 040782 | 2/2010 |
| DE | 10 2011 004104 | 8/2012 |
| EP | 1556526 A2 | 7/2005 |
| JP | S54-151535 A | 11/1979 |
| JP | 2003-161203 | 6/2003 |
| JP | 2011-539404 A | 12/2011 |
| WO | 2010/012705 A1 | 2/2010 |
| WO | 2013178550 A1 | 12/2013 |

\* cited by examiner

COMPONENT COMPOSITE, METHOD FOR MANUFACTURING A COMPONENT COMPOSITE AS WELL AS UTILIZATION OF A COMPONENT COMPOSITE

FIELD OF THE INVENTION

The present invention relates to a component composite. Furthermore, the present invention relates to a method for manufacturing a component composite as well as the utilization of a component composite according to the present invention.

BACKGROUND INFORMATION

A component composite as well as a method for manufacturing a component composite according to the definitions of the species in the two independent claims are discussed in DE 10 2008 040 782 A1 of the applicant. In this component composite, it is provided that a first contact surface is formed on a first component which is made of metal. The first contact surface is generated with the aid of electromagnetic radiation, in particular with the aid of a laser beam device, and has a surface structure which includes a microstructure which is superposed by a nanostructure. The component or its first contact surface formed in this way is put in contact with a second contact surface of a second component. In this case, the second component is made of plastic, the material of the second component being heated to beyond the melting point of the material of the second component for the purpose of the second contact surface contacting the first contact surface. In addition, the component composite may also have a form-locked connection which is generated by extrusion-coating the first component using the second component, the first component having a suitable form-locked geometry. The component composite known from the above-mentioned publication enables a relatively solid composite or a relatively solid and tight connection between the two components. The component composite is, however, limited to applications in which the first component is made of metal, ceramic, or plastic and the second component is made of plastic. Suggestions for transferring the component composite to other applications are not derivable from the publication mentioned above.

SUMMARY OF THE INVENTION

Against the backdrop of the provided related art, the object of the present invention is to refine a component composite or a method for manufacturing a component composite according to the definitions of the species in such a way that expanded application possibilities result for the component composite. In particular, expanded application possibilities of this type should provide the possibility of current conduction.

This object may be achieved according to the present invention with the aid of a component composite and a method for manufacturing a component composite having the features described herein. For this purpose, the present invention is based on the idea to also form the second component of the component composite from metal, analogously to the first component. It is thus made possible to use the component composite for current conduction, e.g., in components of automotive technology.

According to the present invention, the component composite includes a first component having a first contact surface and at least one second component having a second contact surface contacting the first contact surface, the first contact surface having a surface structure which has a microstructure which is superposed by a nanostructure, the contact of the second contact surface on the first contact surface taking place by at least partially melting the material of the second component, the second component being made of metal. The melting point of the material of the first component may be higher than the melting point of the material of the second component.

The method according to the present invention for manufacturing the component composite is characterized in that the heating of the material of the second component to beyond its melting point takes place only locally in the contact area of the second contact surface on the first contact surface of the first component. The advantage is thus achieved that the two components may be already mounted or positioned in a motor vehicle component in advance, for example, so that the implementation according to the present invention of the component composite may take place locally in the motor vehicle component. Moreover, due to the fact that the heating takes place only locally, in particular in the second component which is already situated in operative connection with other components, the advantage is achieved that the thermal strain on the other components (through the thermal conduction via the second component) is reduced or minimized.

Advantageous refinements of the component composite according to the present invention and of the method for manufacturing the component composite according to the present invention are indicated in the respective further descriptions herein. Any combinations of at least two of the features provided herein, the description, and/or the figures fall within the scope of the present invention. Here, the features provided for the method are supposed to be applicable for the device, and the features provided for the device are supposed to be applicable for the method.

In one concrete embodiment of the component composite, it is provided that the first component is made of copper and the second component is made of aluminum. In this way, due to the different melting points of the materials of the two components, the advantage is achieved relatively simply that when the second component is melted, the surface structure of the first component which includes the microstructure and nanostructure is prevented from melting or being damaged.

In order to achieve a mechanically particularly robust or solid connection of the two components involved in the component composite, it is provided in one embodiment of the present invention that an additional form-locked connection is formed between the two components, which may be in the area of the two contact surfaces.

A first contact surface or the form-locked connection may be formed at a periphery of the first component in the area of a ring groove. Alternatively, it is, however, also conceivable that the first contact surface is formed in the area of a recess or indentation on the first component.

In one method for manufacturing the component composite, it is provided that the heating of the second component takes place with the aid of a laser beam, with the aid of an ultrasound, or with the aid of the effect of flames. In this case, the suitable selection of the heat source strongly depends on the utilization provided in each particular case or on the geometric configuration and configuration of the components.

One utilization of the component composite according to the present invention is seen in the connection of components or elements in electronic or electrical components, in particular in control units, sensors, and plugs, or in connecting battery cells, which may be in automotive applications in each case.

Further advantages, features, and details of the present invention are derived from the following description of exemplary embodiments and the drawings.

Identical elements or elements having identical functions are provided with identical reference numerals in the figures.

DETAILED DESCRIPTION

Figure 1:
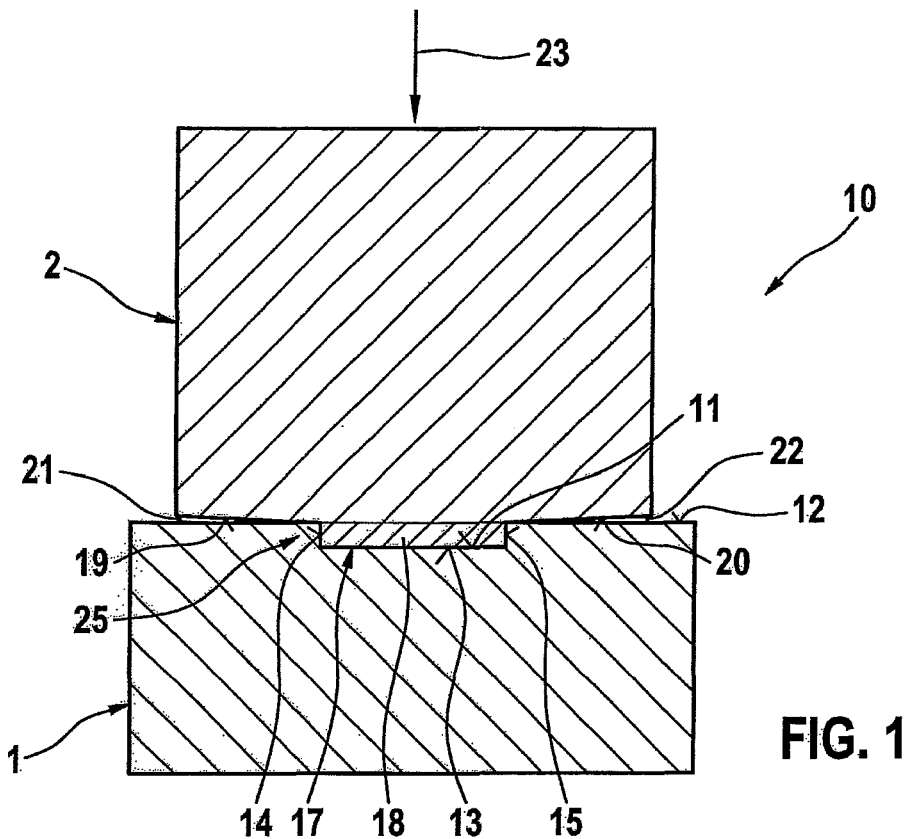
FIG. 1 shows a longitudinal section through a first component composite according to the present invention in which a structured surface structure is formed on a front side of a first component.

FIG. 1 shows a first component composite 10 which includes two components 1, 2. Both components 1, 2 are made of metal. For example, the one, first component 1 is made of copper, and the other, second component 2 is made of aluminum. It is essential that the melting point of the material of first component 1 is higher than the melting point of the material of second component 2. In the illustrated exemplary embodiment, both components 1, 2 have an approximately block-shaped configuration, as an example. First component 1 has, in cross-section, an approximately rectangular-shaped recess or indentation 11 on its front side facing second component 2. Upper side 12 of first component 1 is formed as a flat or planar upper side 12. The surfaces which make up indentation 11, at least front side 13 which is opposite second component 2, and may, however, also be peripheral surfaces 14, 15 which are situated on the periphery of indentation 11 (as well as the peripheral surfaces (not illustrated) which are present in parallel to the drawing plane of FIG. 1), each have a surface structure 17. Surface structure 17 forms a first contact surface (for second component 2) and is generated with the aid of electromagnetic radiation, in particular with the aid of a laser beam device, and has a microstructure which is superposed by a nanostructure.

With respect to the exact configuration of a surface structure 17 of this type, i.e., with regard to how a surface structure 17 of this type is generated, and with respect to what geometric relations surface structure 17 may have, reference is made to DE 10 2008 040 782 A1 of the applicant whose description is supposed to be an integral part of this application in this regard.

Second component 2 has an extension 18 which is formed on the side facing first component 1 in accordance with the geometry of indentation 11, which protrudes in an at least approximately form-locked manner into indentation 11 and which forms a second contact surface. It is furthermore apparent based on FIG. 1 that the two front sides 19, 20 of second component 2 which are formed laterally from extension 18 are configured or situated slightly obliquely, so that an approximately wedge-shaped gap 21, 22 is formed in the connecting area of the two components 1, 2.

The two components 1, 2 are connected in that the material of the one component 2 which has the lower melting point is heated only locally, in the illustrated exemplary embodiment in the area of extension 18, for example, to beyond its melting point, and in that extension 18 of component 2 is pushed in this state into indentation 11 in the direction of arrow 23. In this case, a contact of the second contact surface of extension 18 with surface structure 17 of component 1, which forms the first contact surface, is ensured by applying a force in the direction of arrow 23, so that the liquefied material of component 2 fills surface structure 17 and ensures an increased adhesion or an improved connection and tightness between the two components 1, 2. Due to indentation 11 and extension 18, an (additional) form-locked connection 25 is moreover formed between the two components 1, 2 which prevents a relative movement of the two components 1, 2 in a direction which is parallel to upper side 12 of first component 1 and to front sides 19, 20 of second component 2.

Figure 2:
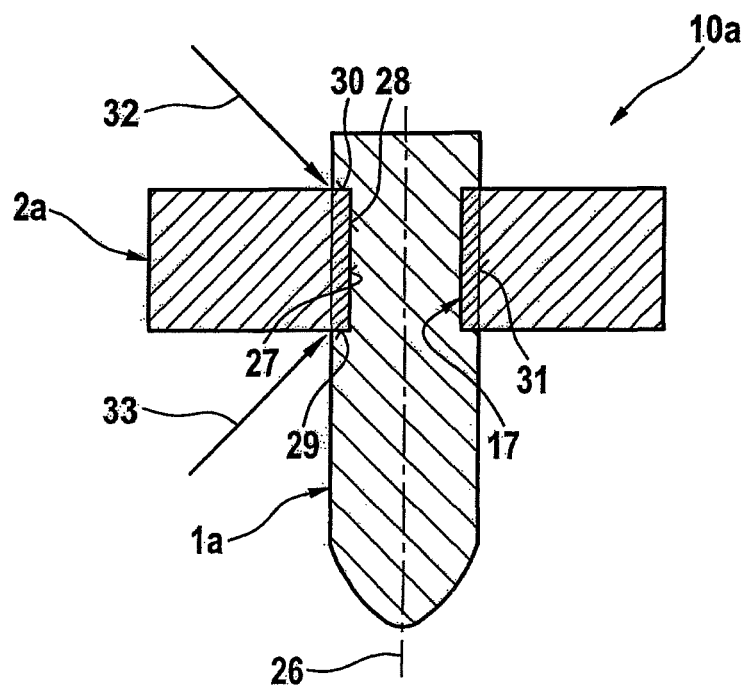
FIG. 2 shows a second component composite according to the present invention in which a structured surface structure is formed on the periphery of a first component.

A modified component composite 10a is illustrated in FIG. 2. In this case, first component 1a is configured in the form of a pencil having a longitudinal axis 26 and has a radially circumferential ring groove 27 at the height of second component 2a. At least bottom 28 of ring groove 27, and may, however, also be the two radially circumferential surfaces 29, 30 of ring groove 27, has, analogously to component 1 of component composite 10 a surface structure 17, surface structure 17 forming a first contact surface.

Second component 2a is configured in the form of a plate, as an example, and has a through borehole 31 which, in particular, enables an insertion of first component 1 through second component 2. The two components 1a, 2a form a current-conducting plug connection, component 1a forming a pin, for example, and component 2a forming a lead frame, for example.

Due to the effect of a laser beam 32, 33 on the upper side or on the bottom side of second component 2a in the connecting area to first component 1a, the material of second component 2a is, for example, heated at least sectionally, beyond its melting point, so that the liquefied material, forming a second contact surface, fills surface structure 17 which is formed in ring groove 27 of first component 1a, so that the two contact surfaces get in contact. As a consequence of ring groove 27, the two components 1a, 2a also form in the final state an additional form-locked connection 25, which prevents the two components 1a, 2a from moving in the direction of longitudinal axis 26 toward one another.

It is mentioned in addition that instead of using a laser beam 32, 33, it is also conceivable to locally heat second component 2a with the aid of other heat sources on component composite 10, 10a. Another heat source of this type may include the use of a flame or an ultrasonic oscillation generator, for example.

Component composite 10, 10a described so far may be changed or modified in various ways, without deviating from the inventive idea. In particular, the geometric shape of components 1, 1a, 2, 2a may deviate from the illustrated geometric configurations, or other (metallic) material pairings may be used. It is only essential to the present invention that second component 2, 2a is also made of metal and has a lower melting point than first component 1, 1a.

What is claimed is:

1. A component composite, comprising:
a first component having a planar upper side comprising an indentation formed therein having a plurality of peripheral surfaces and a bottom surface defining a first contact surface, wherein the first contact surface has a surface structure having a microstructure which is superposed by a nanostructure; and
a second component having two oblique front sides with an extension disposed therebetween, the extension defining a second contact surface, wherein the extension has a plurality of peripheral surfaces having the same cross-sectional geometry as the indentation and protrudes into the indentation to fill the indentation and form a form-locked connection with the peripheral surfaces of the indentation, and wherein the second contact surface contacts the first contact surface such that a wedge-shaped gap is situated between each of the two front sides and the planar upper side;

wherein the contact of the second contact surface with the first contact surface takes place by heating the material of the second component to a temperature beyond its melting point only locally at a contact area of the extension with the indentation to at least partially melt the material of the extension at the second contact surface such that liquefied material of the second contact surface fills the surface structure of the first contact surface to create an adhesion between the second component and the first component at the first contact surface, wherein the second component is made of metal, and wherein the melting point of a material of the first component is higher than the melting point of the material of the second component.

2. The component composite of claim 1, wherein the first component is made at least predominantly of copper and the second component is made at least predominantly of aluminum.

3. The component composite of claim 1, wherein it is used for connecting components or elements in electronic components or electrical components, or for connecting batteries.

4. The component composite of claim 1, wherein it is used for connecting components or elements in control units, sensors, and plugs, or for connecting batteries.

5. A method for manufacturing a component composite, the method comprising:
   providing a first component having a planar upper side comprising an indentation formed therein having a plurality of peripheral surfaces and a bottom surface defining a first contact surface, wherein the first contact surface has a surface structure having a microstructure which is superposed by a nanostructure;
   providing a second component having two oblique front sides with an extension disposed therebetween, the extension defining a second contact surface, wherein the extension has a plurality of peripheral surfaces having the same cross-sectional geometry as the indentation and protrudes into the indentation to fill the indentation and form a form-locked connection with the peripheral surfaces of the indentation, wherein the second contact surface contacts the first contact surface such that a wedge-shaped gap is situated between each of the two front sides and the planar upper side, wherein the second component is made of metal, and wherein the melting point of the material of the first component is higher than the melting point of the material of the second component; and
   heating a material of the second component to a temperature beyond its melting point for the purpose of contacting the first component, wherein the heating of the material of the second component to beyond its melting point takes place only locally at a contact area of the extension with the indentation;
   wherein the contact of the second contact surface with the first contact surface takes place by at least partially melting the material of the extension at the second contact surface such that liquefied material of the second contact surface fills the surface structure of the first contact surface to create an adhesion between the second component and the first component at the first contact surface.

6. The method of claim 5, wherein the heating of the second component occurs with the aid of a laser beam, an ultrasound, or the effect of flames.

7. The method of claim 5, wherein the surface structure is generated with the aid of electromagnetic radiation from a laser beam device.

* * * * *